United States Patent
Rohr

[11] 3,896,412
[45] July 22, 1975

[54] METHOD AND APPARATUS FOR LOGGING THE COURSE OF A BOREHOLE

[75] Inventor: Ulrich Rohr, Hamburg, Germany

[73] Assignee: Deutsche Texaco Aktiengesellschaft, Hamburg, Germany

[22] Filed: Nov. 19, 1973

[21] Appl. No.: 417,445

[52] U.S. Cl............ 340/15.5 BA; 181/102; 175/45; 33/304; 33/313
[51] Int. Cl. .................... G01v 1/40; G01C 9/14
[58] Field of Search.......... 181/15 TS, 102; 175/45; 73/151.5; 33/174 C, 304, 308, 313; 340/15.5 BH

[56] References Cited
UNITED STATES PATENTS

| | | | |
|---|---|---|---|
| 2,635,349 | 4/1953 | Green | 33/304 |
| 3,587,175 | 6/1971 | Armistead | 33/313 |
| 3,587,176 | 6/1971 | Schaerb | 33/313 |
| 3,753,296 | 8/1973 | Stanwyk | 33/304 |
| 3,791,043 | 2/1974 | Russell | 33/313 |

FOREIGN PATENTS OR APPLICATIONS

| | | | |
|---|---|---|---|
| 544,410 | 1/1956 | Belgium | 3/313 |
| 952,611 | 10/1956 | Germany | 33/174 C |
| 1,138,364 | 10/1962 | Germany | 33/205 |

*Primary Examiner*—Maynard R. Wilbur
*Assistant Examiner*—N. Moskowitz
*Attorney, Agent, or Firm*—T. H. Whaley; C. G. Ries; Ronald G. Gillespie

[57] ABSTRACT

The course of a borehole is determined by sending a logging tool down the borehole containing apparatus for measuring an angle of inclination $\phi$ and an azimuth angle $\theta$. The signals are transmitted to surface electronics which also receives a signal corresponding to the rate $dl/dt$ of descent of the logging tool into the borehole. A cartesian coordinate system having a reference point at the mouth of the borehole has three coordinates axis perpendicular to each other and identified as $A_N$, $A_O$ and $T_V$. The $T_V$ axis extends in a vertical direction, the $A_N$ axis extends in a horizontal northerly direction and the $A_O$ extends in a direction 90° from the $A_N$ and $T_V$ axial direction. The surface electronics is computer type apparatus which continuously converts the signals corresponding to the angle $\phi$ and $\theta$ and to the rate $dl/dt$ to a point defining the position of the logging tool at the instant of measurement. As each point is recorded as the logging tool moves through the borehole, a record is made of the course of the borehole.

The apparatus and method of the invention also provide for discontinuous operation either at the surface or in the transmission of signals of the logging tool.

5 Claims, 6 Drawing Figures

3,896,412

METHOD AND APPARATUS FOR LOGGING THE COURSE OF A BOREHOLE

BACKGROUND OF THE INVENTION

FIELD OF THE INVENTION

The present invention relates to well logging in general and, more particularly, to a method and apparatus for logging the course of a borehole.

SUMMARY OF THE INVENTION

A logging tool is moved through a borehole. The logging tool includes apparatus for measuring the sine of an angle $\phi$ of inclination and provides a signal corresponding to sin $\phi$. Other apparatus in the logging tool measures an azimuth angle $\theta$ and provides a signal corresponding to the cos $\theta$. At the surface the rate $dl/dt$ of travel by the logging tool is measured and a signal corresponding to the rate $dl/dt$ is provided. A computing circuit continuously computes the position of the logging tool in accordance with the sin $\phi$, cos $\theta$ and the $dl/dt$ signals so that as the tool travels through the borehole the course of the borehole is measured.

The objects and advantages of the invention will appear more fully hereinafter, from a consideration of the detailed description which follows, taken together with the accompanying drawing wherein several embodiments are illustrated by way of example. It is to be expressly understood, however, that the drawings are for illustrative purposes only and are not to be construed as defining the limits of the invention.

DESCRIPTION OF THE INVENTION

In the drilling operation, the driller wants to have the most accurate knowledge possible of the geometrical course of the borehole that he is drilling. Without this knowledge he would be unable to drill in the desired direction, for example, towards and into a productive deposit. Further, it is also necessary to associate well samples produced from a particular depth to a particular geographical location for a complete investigation of the geological profile of the area where the drilling operations are being carried out. This can be done only if every point of the borehole along its course can be located with precision.

The position of the drill may be defined by an azimuth angle $\theta$, an angle $\phi$ of inclination and its depth in the borehole. Using the mouth of the borehole at the surface as a reference point, a cartesian coordinate system having coordinates $T_1$, $A_N$ and $A_O$ which extend downward to the north and to the east, respectively, may be established. Using such a coordinate system, the location of the draft may be defined as follows:

$$T_v = \int_o^t (\frac{dl}{dt} \cos \phi \, dt) \quad (1)$$

$$A_N = \int_o^t (\frac{dl}{dt} \sin \phi \cos \theta) \, dt \quad (2)$$

$$A_O = \int_o^t (\frac{dl}{dt} \sin \phi \sin \theta) \, dt \quad (3)$$

where $dl/dt$ is rate of travel of the drill.

Figure 1:
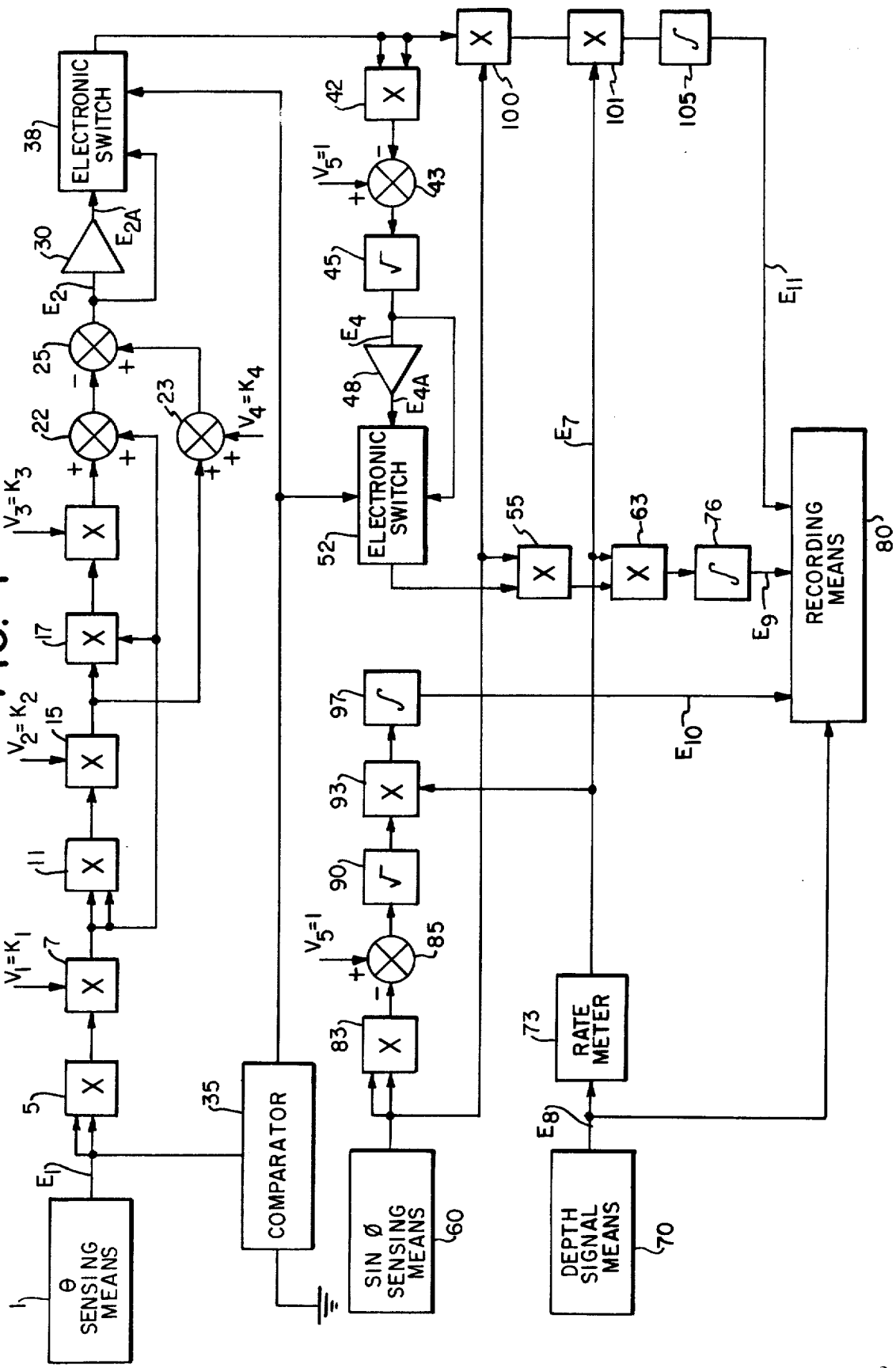
FIG. 1 is a simplified block diagram of a system, constructed in accordance with the invention, for recording the course of a borehole in an earth formation.

Referring now to FIG. 1, there is shown $\theta$ sensing means 1 providing a signal $E_1$ corresponding to the azimuth angle $\theta$. $\theta$ sensing means 1 is shown in detail in FIG. 2 and will be described hereinafter. Multipliers 5, 7, 11, 15, 17 and 20, summing means 22 and 23 and subtracting means 25 cooperate to provide a signal $E_2$ corresponding to cos $\theta$. Multiplier 5 effectively squares signal $E_1$ to provide an output to multiplier 7 where it is multiplied with a direct current voltage $V_1$. Voltage $V_1$ corresponds to a constant $K_1$ which may have a value of one-half. The signal from multiplier 7 is effectively squared by multiplier 11 to provide a signal to multiplier 15 receiving a direct current voltage $V_2$ which corresponds to a constant $K_2$ having a value of one-sixth. The signal from multiplier 15 is applied to multiplier 17 which also receives the signal from multiplier 7 to provide a signal to multiplier 20. Multiplier 20 multiplies the signal from multiplier 17 with a direct current voltage $V_3$ corresponding to a constant $K_3$ having a value of one-fifteenth. The signal from multiplier 20 is summed with the signal from multiplier 7 by summing means 22. Summing means 23 sums a direct current voltage $V_4$, corresponding to a constant $K_4$, having a value of 1, with the signal from multiplier 15. The signal provided by summing means 22 is subtracted from the sum signal provided by summing means 23 by subtracting means 25 to provide signal $E_2$.

A unity gain inverting amplifier 30 inverts signal $E_2$ to provide a signal $E_{2A}$ corresponding to $-\cos \theta$ since the angle $\theta$ can have a negative cosine as well as a positive cosine. Signal $E_1$ is applied to a comparator 35 which is connected to a ground reference. When signal $E_1$ is positive in respect to the ground reference, comparator 35 controls an electronic switch 38 to pass signal $E_2$ as the cos $\theta$ signal. When signal $E_1$ is negative with respect to the ground reference, comparator 35 controls switch 38 to pass signal $E_{2A}$ as the $-\cos \theta$ signal.

A multiplier 42, subtracting means 43 and a square root circuit 45 cooperate to provide a signal $E_4$ corresponding to sin $\theta$. The cosine signal from switch 38 is effectively squared by multiplier 42. Subtracting means 43 receives a direct current voltage $V_5$ corresponding to a value of 1. Subtracting means 43 subtracts the signal provided by multiplier 42 from voltage $V_5$ to provide a signal to the square roots circuit 45 corresponding to $1 - \cos^2 \theta$. Square root circuit 45 provides a signal which corresponds to $1-\cos^2 \theta$ which also corresponds to sin $\theta$.

An inverting amplifier 48 provides a signal corresponding to a negative sin $\theta$. An electronic switch 52, controlled by the output of comparator 35, passes signal $E_4$ when signal $E_1$ is more positive than the ground reference and passes signal $E_{4A}$ when signal $E_1$ is not more positive than the ground reference. A multiplier 55 multiplies the signal provided by switch 52 with a signal $E_6$ corresponding to the sine of the inclination angle $\phi$. Signal $E_6$ is provided by sin $\phi$ sensing means 60 which may be of the type described in detail hereinafter. Multiplier 55 provides a signal corresponding to the term sin $\phi$ sin $\theta$.

Another multiplier 63 multiplies the product signal from multiplier 55 with a signal $E_7$ corresponding to the rate of descent (or ascent) of the logging tool. Depth signal means 70 which may be of a conventional type provides a signal $E_8$ corresponding to the depth of the tool to a rate meter 73. Rate meter 73 provides signal $E_7$ in accordance with signal $E_8$. Multiplier 63 provides a signal corresponding to the product sin $\phi$ sin $\theta$ $dl/dt$ to an integrator 76, which may be of a conventional type. Integrator 76 integrates the signal to provide a signal $E_9$ corresponding to the term $A_0$ in equation (3) to conventional type recording means 80. Signal $E_8$ from depth signal means 70 is also applied to recording means 80 driving recording means 80 so that the signals recordings may be correlated to particular depths.

A signal corresponding to the term $T_1$ of equation 1 is developed in the following manner. Signal $E_6$ is effectively squared by a multiplier 83. Subtracting means 85 subtracts the signal from multiplier 83 from direct current voltage $V_5$ which corresponds to 1 to provide a signal corresponding to the expression $1 - \sin^2\phi$ to a square root circuit 90. Square root circuit 90 provides a signal corresponding to $1 - \sin^2\phi$ which also corresponds to the cos $\phi$. The signal from square root circuit 90 is applied to a multiplier 93 receiving signal $E_7$. Multiplier 93 provides a signal corresponding to the term cos $\phi$ $dl/dt$ to an integrator 97 which integrates the signal to provide signal $E_{10}$ corresponding to $T_1$.

The cos $\theta$ signal from switch 38 is multiplied with signal $E_6$ by a multiplier 100 to provide a signal corresponding to the term sin $\phi$ cos $\theta$ to another multiplier 101 receiving signal $E_7$. Multiplier 101 provides a signal corresponding to the term sin $\phi$ cos $\theta$ $dl/dt$ to an integrator 105. Integrator 105 provides a signal $E_{11}$ corresponding to the term $A_M$ of equation (2) to recording means 80. Recording means 80 is driven by signal $E_8$ and continuously records signals $E_9$, $E_{10}$ and $E_{11}$.

Figure 2:
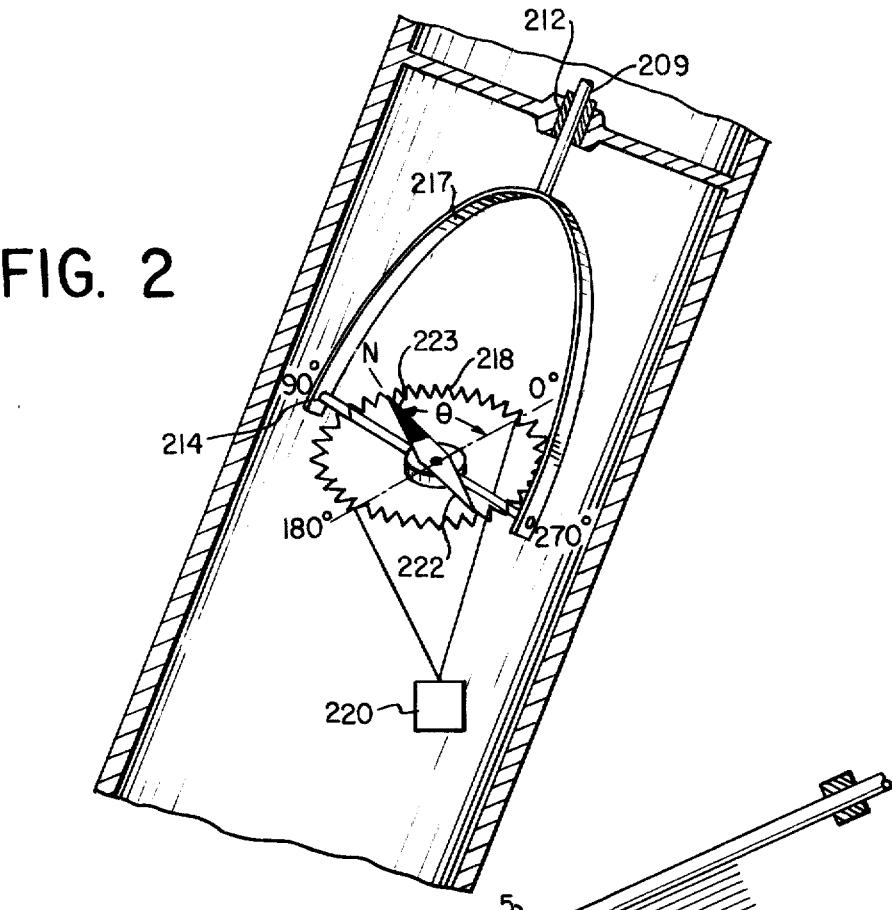
FIGS. 2 and 3 show the $\theta$ sensing means and the sin $\phi$ sensing means, respectively, shown in FIG. 1.

Referring to FIG. 2, $\theta$ sensing means 1 includes a shaft 209 which is journalled in a bearing 212 at the axis of symmetry of the logging instrument. Shaft 209 can rotate about the axis of symmetry. Shaft 209 is connected to an axle 214 by a fixed stirrup 217. Axle 214 is journalled in stirrup 217 and rigidly connected to a potentiometer coil 218. By means of a weight 220, potentiometer coil 218 is constantly maintained in the horizontal. A magnetic needle 222 supported in the center of the potentiometer coil 218 with its north point 223 senses the electrical potential at the potentiometer coil 218 and transmits it as a signal $E_1$ via electrical cables (not shown) to the elements hereinbefore described receiving signal $E_1$. Potentiometer coil 218 is designed in such a way that the potential is zero at 0° and rises to a maximum positive value which is proportional to an azimuth angle $A_z$ up to 180° in a counterclockwise direction. At 180° the potential becomes negative. In the range between 180° and 360° the potential rises from 0 to the maximum negative value which is proportional to the difference $[A_z - 180°]$. By dividing the entire azimuth range between 0° and 360° into two sections covering the ranges of 0° to 180° to 360°, respectively, the cosine values determined by the borehole computer may be calculated with greater accuracy. A still more accurate calculation of the cosine values is achieved with an approximative formula when the entire azimuth range is divided into four equal sections. But this does not imply a basic modification of the instant method.

There is a continuous output of measured data, for example, in a form of signal $E_1$, proportional to the azimuth angle $\theta$, in accordance with the following formula:

$$E_1 = +K_\theta \quad -\theta \text{ for } 0 \, \theta \, 180°$$

(4)

$$E_1 = -K_\theta \quad (\theta - 180°) \text{ for } 180° \, \theta \, 360°$$

(5)

The proportionality factor $K_\theta$ is dependent upon the resistance of the potentiometer coil based on its circumferential length.

Figure 3:
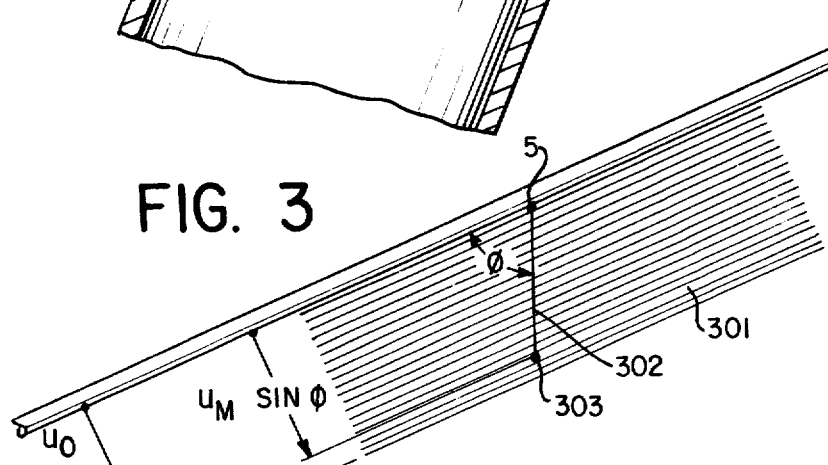

Referring now to FIG. 3, there is shown sin $\phi$ sensing means 60 in greater detail. Sensing means 60 includes a potentiometer coil 301 and a plum bob 302 with a contact sensor 303. Potentiometer coil 301 is free to swing about the axis of symmetry 305 of the logging tool. The windings of potentiometer coil 301 are parallel to the axis of symmetry 305. Coil 301, by its own weight, always returns to a vertical position. A suspension point 304 of plum bob 302 is firmly attached to potentiometer coil 301 on the symmetry axis 305. At the axis of symmetry, the potential is 0 and it then rises to maximum positive value plus $+U_m$. Sin $\phi$ sensing means 60 thus constantly provides signal $E_6$ in accordance with the following equation:

$$E_6 = +U_M \sin \phi$$

(6)

Figure 4:
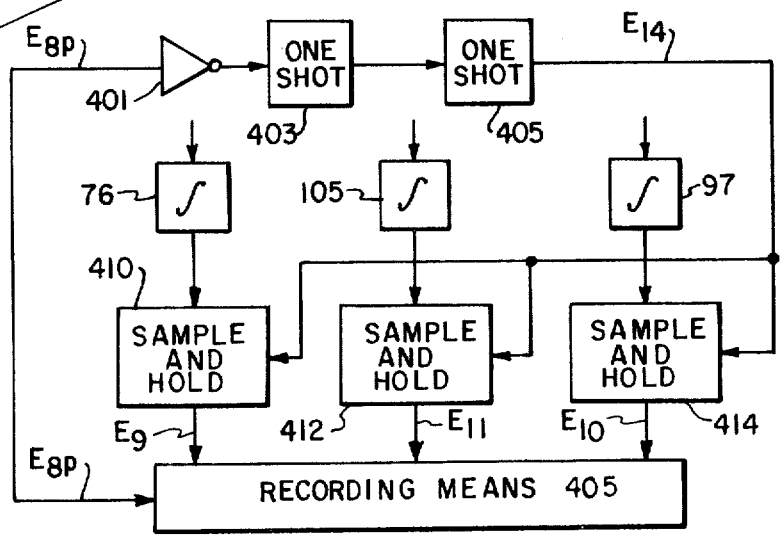
FIG. 4 is a simplified block diagram of a modification that may be made to the apparatus shown in FIG. 1 to provide for discontinuous operation.
Figure 5:
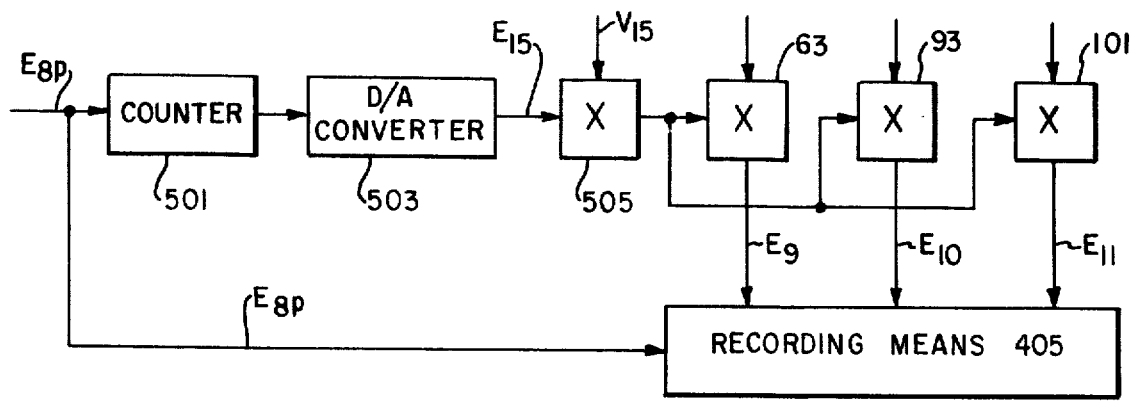
FIG. 5 is a simplified block diagram of another modification which may be made to the system shown in FIG. 1 for intermittent transmission of the measurement signals from the logging tool in the borehole.

In another embodiment of the invention the signals generated downhole correspond to sin $\phi$ and to the azimuth angle $\theta$ and may be discontinuous in nature such as occurs during multiplexing. FIG. 4 shows the required modification for discontinuous operation. Signals $E_1$ and $E_6$ are now pulse signals. Each pulse $E_6$ is inverted by an inverter 401 so that at the start of a pulse in signal $E_6$ a one shot multivibrator 403 is triggered by the output from inverter 401 to provide a time delay pulse. The time delay corresponds to the pulse width of the pulse provided by one shot 403. Upon termination of the time delay pulse, another one shot multivibrator 405 is triggered to provide a sampling pulse $E_{14}$ to sample and hold circuits 410, 412 and 414. Sample and hold circuit 410, 412 and 414 receive the outputs from integrators 76, 105 and 97 respectively and upon occurrence of a sampling pulse $E_{14}$ will sample and hold their outputs to provide signals $E_9$, $E_{11}$ and $E_{10}$, respectively.

When pulse signal $E_6$ goes to a zero value, the inputs to integrators 76, 105 and 97 also go to zero values since signals $E_6$ and $E_1$ will be at zero values causing multipliers 63, 93 and 101 to provide zero value outputs. It is while they are at this zero condition that sample and hold circuits 410, 412 and 414 continue to provide signals $E_9$, $E_{11}$ and $E_{10}$, respectively.

Figure 6:
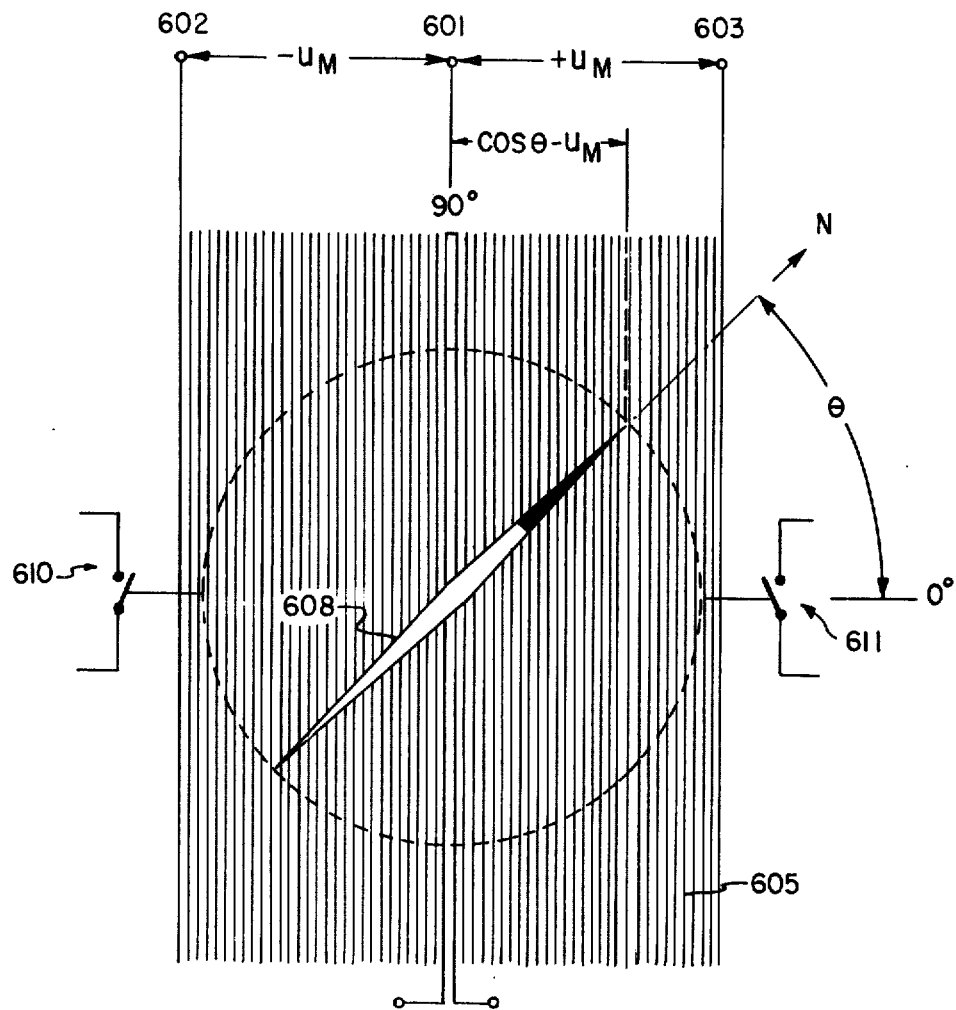
FIG. 6 is a detailed diagram of another variation for providing a signal corresponding to the cos $\theta$.

In another embodiment shown in detail in FIG. 6 there exists a discontinuous processing arrangement in which the depth signal means 70 provides a pulse signal $E_{H0}$. The occurrence of a pulse $E_{H0}$ corresponds with a predetermined amount of travel by the logging tool. The coordinates $T_r$, $A_n$ and $A_o$ may be determined in accordance with the following equations:

$$T_1 = \sum_{\Delta T=1}^{n} (\Delta T)(\cos \phi) \quad (4)$$

$$A_s = \sum_{\Delta T=1}^{n} (\Delta T)(\sin \phi)(\cos \theta) \quad (5)$$

$$A_o = \sum_{\Delta T=1}^{n} (\Delta T)(\sin \phi)(\sin \theta) \quad (6)$$

where the letter $n$ represents the number of pulses in pulse signal $E_K$. Pulses $E_P$ are counted by a conventional type counter 501. 501 may be reset but for convenience the means for resetting is not shown. A digital to analog converter 503 converts the count in counter 501 to an analog signal $E_{15}$ corresponding to the count. A multiplier 505 multiplies signal $E_{15}$ with a direct current voltage $V_{15}$ which corresponds to the predetermined length of the cable. Multiplier 505 provides signals to the multiplier 63, 93 and 101 receiving their signals as shown in FIG. 1 from multiplier 55, square root circuit 90 and multiplier 101, respectively. Multipliers 63, 93 and 101 provides signals $E_9$, $E_{10}$ and $E_{11}$, respectively, to recording means 405 which is driven by the pulse signal $E_{1R}$.

Referring now to FIG. 6, there is disclosed another embodiment of means for sensing the cosine of the azimuth angle $\theta$. It should be noted that if the means shown in FIG. 6 is used then elements 5 through 25 and 35 shown in FIG. 1 may be omitted since their function is to provide a signal corresponding to the cosine of $\theta$ which may be done directly by the means shown in FIG. 6. A potentiometer coil 6 is constantly maintained in the horizontal by a similar means as described before for the sensing means described and detailed in FIG. 2. A magnetic needle 608 has a north point 607 and senses the potential relative to a measuring point 601. At measuring point 601 the potential equals zero. At another measuring point 602, the potential has a maximum negative value $-U_m$. At still another measuring point 603, the potential has a maximum positive value $+U_m$. Thus the voltage sensed at the potentiometer is always directly proportional to cosine $\theta$, as can be seen by the following equation:

$$E_{\cos \theta} = U_M \cos \theta \quad (7)$$

Two switches 610 and 611 are provided, since the sine values over the entire range of 0° to 360° have to be determined from the cosine values by means of inverting amplifier 30. In this regard switches 610 and 611 will be utilized with a DC voltage to control electronic switch 38 so that when needle 608 moves past one of the switches 610 or 612, the sine of the value determined is changed. When the north point 607 lies between 0° and 180° both switches 610 and 611 are open between 180° and 360° both switches 610, 611 are closed.

What is claimed is:

1. A system for logging the course of a borehole comprising a logging tool including means for providing a $\theta$ signal corresponding to an azimuth angle $\theta$, and means for providing a $\phi$ signal corresponding to an angle $\phi$ of inclination; conduction means connected to all the signal means in the logging tool for conducting the signals to the surface, and surface electronics including means for providing a $dl/dt$ signal corresponding to the rate of travel of the logging tool through the borehole; means connected to the conducting means and to the $dl/dt$ signal means for providing a $T_r$ signal in accordance with the $\phi$ signal and the $dl/dt$ signal, said $T_r$ signal corresponds to a distance along an axis $T_r$ of a cartesian coordinate system having its reference point at the mouth of the borehole, the axis $T_r$ extends in a vertical direction; means connected to the conducting means and to the $dl/dt$ signal means for providing an $A_N$ signal in accordance with the $\phi$, $\theta$ and $dl/dt$ signals, said $A_N$ signal corresponds to a distance along an axis $A_N$ in the coordinate system which extends in a northern direction from the reference point, means connected to the conducting means and to the $dl/dt$ signal means for providing an $A_o$ signal in accordance with the $\phi$, $\theta$ and $dl/dt$ signals, said $A_o$ signal corresponds to a distance along an axis $A_o$ in the coordinate system which extends in a direction perpendicular to the directions of the $T_r$ and $A_N$ axes.

2. A system as described in claim 1 in which the $T_r$ signal means provides the $T_r$ signal in accordance with the following equation:

$$T_r = \int_o^t (dl/dt \cdot \cos \phi) \, dt,$$

the $A_N$ signal means provides the $A_N$ signal in accordance with the following equation:

$$A_N = \int_o^t (dl/dt \cdot \sin \phi \cdot \cos \theta) \, dt,$$

and the $A_o$ signal means provides the $A_o$ signal in accordance with the following equation:

$$A_o = \int_o^t (dl/dt \cdot \sin \quad \cdot \sin \theta) \, dt.$$

3. A system as described in claim 2 in which the $\phi$ signal means provide a signal corresponding to sin $\phi$ as the $\phi$ signal, and the $A_N$ signal means includes means connected to the conducting means for providing a signal corresponding to $\theta^2$ in accordance with the $\theta$ signal, means for providing signals corresponding to $K_1$ through $K_4$, means connected to the K signal means and to the $\theta^2$ signal means for providing a signal corresponding to $K_1 \theta^2$, means connected to the last mentioned means for squaring the $K_1 \theta^2$ signal to provide a signal corresponding to $K_1^2 \theta^4$, means connected to the last mentioned means and to the $K_2$ signal means for providing a signal corresponding to $K_1^2 K_2 \theta^4$, means receiving the $K_1^2 K_2 \theta^4$ signal and connected to the $K_1 \theta^2$ signal means for providing a signal corresponding to $K_1^3 K_2 \theta^6$, means receiving the $K_1^3 K_2 \theta^6$ signal and connected to the K signal means for providing a signal corresponding to $K_1^3 K_2 K_3 \theta^6$, first summing means connected to the last mentioned means and to the $K_1\theta^2$ signal means for providing a signal corresponding to $K_1\theta^2+K_1{}^3K_2K_3\theta^6$, second summing means connected to the $K_1{}^2K_2\ \theta^4$ signal means and to the K signal means for providing a signal corresponding to $K_4+K_1{}^2K_2\theta^4$, subtracting means connected to both summing means for subtracting the signal provided by the first summing means from the signal provided by the second summing means to provide a signal corresponding to COS $\theta$, means connected to the subtracting means for inverting the signal from the subtracting means to provide a signal corresponding to $-$COS $\theta$, first switching means connected to the inverting means, to the subtracting means and to the comparing means for passing either the COS $\theta$ signal or the $-\theta$ signal in accordance with the comparison signal from the comparing means, first multiplying means connected to the first switching means and to the conduction means for providing a product signal in accordance with the sin $\phi$ signal and the passed signal from the first switching means, second multiplying means connected to the $dI/dt$ signal means and to the first multiplying means for providing a second product signal in accordance with $dI/dt$ and the first product signal, and an integrator connected to the second multiplying means integrates the second product signal to provide the $A_N$ signal.

4. A system as described in claim 3 in which the $T_r$ signal means includes means connected to the conducting means for providing a signal corresponding to $\sin^2 \phi$ in accordance with the sin $\phi$ signal, means receiving a direct current voltage corresponding to a value of 1 and connected to $\sin^2 \phi$ signal means for providing a signal $1-\sin^2 \phi$, means connected to the $1-\sin^2 \phi$ signal means for providing a signal corresponding to cos $\phi$, third multiplying means connected to the cos $\phi$ signal means and to the $dI/dt$ signal means for providing a signal corresponding to $dI/dt\cdot\cos \phi$, and a second integrator connected to the third multiplying means integrates the $dI/dt\cdot\cos \phi$ signal to provide the $T_r$ signal.

5. A system as described in claim 4 in which the $A_o$ signal means includes means connected to the switching means for providing a signal corresponding to $\cos^2 \theta$, means receiving the direct current voltage corresponding to a value of 1 for providing a signal corresponding to $1-\cos^2 \theta$, means connected to the $1-\cos^2 \theta$ signal means for providing a signal corresponding to sin $\theta$, second inverting means connected to the sin $\theta$ signal means for providing a signal corresponding to $-\sin \theta$, second switching means controlled by the comparison signal from the comparing means to pass either the sin $\theta$ signal or the $-\sin \theta$ signal in accordance with the comparison, fourth multiplying means connected to the second switching means and to the conducting means for providing a fourth product signal in accordance with the passed signal from the switching means and the sin $\phi$ signal, fifth multiplying means connected to the fourth multiplying means and to the $dI/dt$ signal means for providing a fifth product signal corresponding to $[\ dI/dt\cdot(\pm \sin \theta)\cdot\sin\phi]$, and a third integrator integrates the fifth product signal to provide the $A_o$ signal.

* * * * *